JOHN GOETZ
Grain Cleaner

No. 117715

PATENTED AUG 1 1871

Witnesses:
H. H. Young
Chas. E. Upperman

Inventor
John Goetz, By his Attorney,
T. H. Upperman

UNITED STATES PATENT OFFICE.

JOHN GOETZ, OF WEST BEND, WISCONSIN.

IMPROVEMENT IN FANNING-MILLS.

Specification forming part of Letters Patent No. 117,715, dated August 1, 1871.

*To all whom it may concern:*

Be it known that I, JOHN GOETZ, of West Bend, in the county of Washington and State of Wisconsin, have invented certain new and useful Improvements in Grain-Cleaners; and I do hereby declare that the following is a full, clear, and exact description of the same, reference being had to the accompanying drawing which makes part of this specification, and in which—

Figure 1:
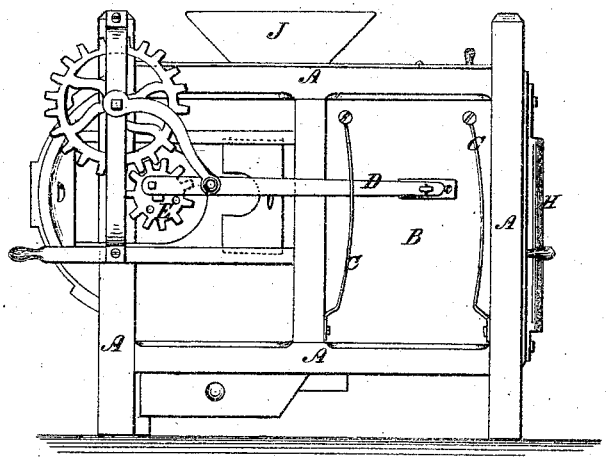
Figure 2:
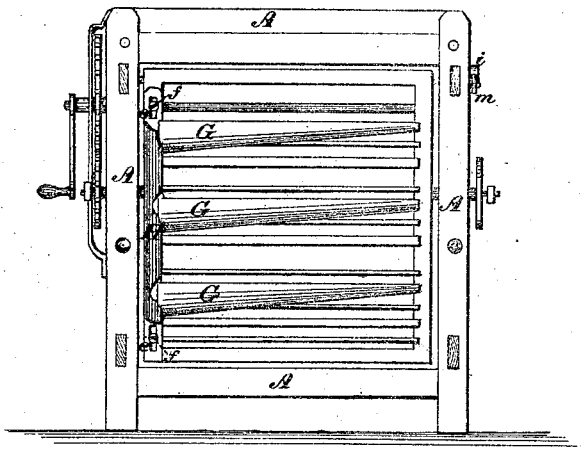
Figure 3:
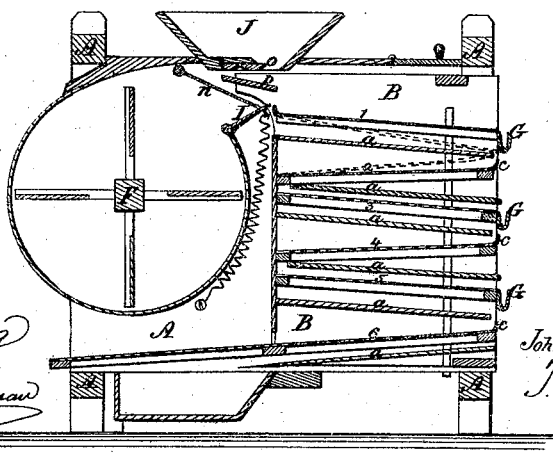

Figure 1 represents a side elevation of a fanning-mill embracing my improvements. Fig. 2 is a rear elevation of the same, and Fig. 3 is a central vertical section taken in the line $x\ x$ of Fig. 2.

My invention relates to machines for cleaning grain; and it consists: First, in providing the rear end of each alternate sieve of a series with an inclined trough or channel for conveying into a suitably-arranged vertical and adjustable trough communicating therewith the substances (such as oats, &c.,) passing over instead of through said sieves, as will be described. Second, in the combination of the inclined troughs of the alternate series of screens and the adjustable vertical trough with the intermediate screens and the conveying-boards, the said screens and boards having such angular relation, one to the other, as that cleaned grain may be delivered at both ends of the machine, as will be further described. Third, in the vertical trough communicating with the inclined troughs or channels of the sieves, made adjustable to accommodate the varying inclination to which the screens may be arranged, as hereinafter described.

In the accompanying drawing, A is the main frame of the fanning-mill, provided with the usual fan-box in front, and in the rear the required space for containing the shoe. B is the shoe, which is suspended by flexible supports C secured to the main frame A, as shown in Fig. 1; and the said shoe receives its vibratory movement back and forth from the pitman D, connected therewith and to a crank-wheel, E, on the end of the fan-shaft F. The shoe B is provided on its inner sides with suitable grooves to receive the different sieves, 1, 2, 3, 4, 5, and 6, and also with grooves to receive the conveying-boards $a$, beneath each sieve, for conveying the grain, &c., passing through the respective sieves onto the sieve next below, and the cockle, grass-seed, chaff, &c., out at the rear of the machine; and this arrangement is continued to the end of the series. The sieves 1, 2, 3, 4, 5, and 6 may be made of sheets of thin metal suitably perforated in accordance with the work required of them; or they may be of wire-cloth, such as are ordinarily used in grain-cleaners. Where sheet metal is used for the sieves their rear ends have ledges $c$ turned upon or formed on them for retaining the grain passing on them from the inclined boards above. When wire sieves are used the end rails of the side frame serve the same end. The sieves 1, 3, and 5 have attached to their rear faces inclined troughs G, which receive such grain as fails to pass through them onto the conveying-boards $a$ below, and, as the said troughs form a part of this series of sieves, they receive the same motion, which causes the oats or other grain passing from said sieves into the inclined troughs to move down therein and be thereby conveyed into the vertical spout H, which is made adjustable by means of slots $e$ and set-screws $f$, or other equivalent devices therefor, to accommodate the adjustment of the sieves and conveying-boards to the different desired angles. Within the fan-box is pivoted, to either side of said box, a suitable deflecting-board, I, the angle of which is determined by the set-screw or notched nut $i$ and pawl $m$, which, being connected by means of a cord or rod, $n$, with the deflecting-board, causes its elevation or depression, as required, and thereby directs the course of the current of air within the fan-box to a greater or lesser degree upon one or the other of the series of sieves within the shoe, thereby effectually ridding the grain being cleaned of all foreign substances.

The grain—it may be wheat and oats or other grain—is placed in the hopper J, and the slide $o$ in the bottom of the latter is so adjusted as to permit the escape of the required quantity, which falls onto the guide-board $p$, forming a part of the shoe, and is thereby conveyed onto sieve 1, through the apertures of which the bulk of the wheat and foreign substances descends. The oats or other grain mixed with the wheat, being unable from their formation to pass through the sieves which are arranged for wheat, finds its way over the rear end of said sieve, and is conveyed by the sieve-trough G into the vertical spout H, from which it is delivered into any suitable receptacle. Such grain and other substances as pass through sieve 1 fall on the inclined board $a$ beneath it and pass therefrom onto sieve 2, and so on alternately through the series, each sieve having beneath it an inclined board for conveying it to the next sieve below, and each alternate sieve having an inclined trough to carry off the grain not passing through the sieves and deliver it in a cleaned condition through the vertical spout H. Throughout the operation such grain as passes into the troughs attached to the rear ends of the sieves is thoroughly cleaned, as is also that which finds its way down the last sieve 6 of the series, which may be furnished throughout its entire length with such openings as will admit of the refuse substances passing down through them onto the refuse-conveyer, or only half-way, as may be desired. The cleaned wheat is delivered into the drawer as usual.

It is oftentimes necessary, in cleaning different kinds of grain, to change the angle of inclination of the sieves and conveying-boards, and for this purpose the shoe is provided with additional grooves, indicated by dotted lines in the drawing. This necessitates an adjustment in my construction of fanning-mill of the vertical trough H, which adjustment is effected by the means heretofore described.

In cleaning the different kinds of grain the necessary changes are made in the series of sieves and conveying-boards; but as this is a feature common to all fanning-mills it need not be further described.

It is sometimes necessary to impart a more rapid vibratory motion to the shoe. This is effected in the usual manner by multiplying the gearing.

Having described my invention, I claim—

1. The combination of the inclined troughs G of the series of sieves 1, 3, and 5, and the vertical adjustable trough H with the series of sieves 2, 4, and 6, and conveying-boards $a$, the said sieves and conveying-boards having such angular relation one to another as that they will cause cleaned grain to be delivered at both ends of the machine, as herein shown and described.

2. The combination, with the inclined troughs G, of the vertical trough H, when made adjustable to accommodate the change of angle of the sieves and conveying-boards in cleaning different kinds of grain, as herein shown and described.

3. The deflecting-board I, the sieves 1, 2, 3, 4, 5, and 6, each alternate sieve provided with the inclined trough G, the adjustable vertical communicating-trough H, and the conveying-boards $a$, when said parts are arranged in the manner herein shown and described.

In testimony whereof I have hereunto signed my name.

JOHN GOETZ.

Witnesses:
B. S. POTTER,
C. H. MILLER.